Jan. 4, 1966 W. B. FELL 3,226,832
LINEARITY TESTING GAUGE
Filed Nov. 12, 1963
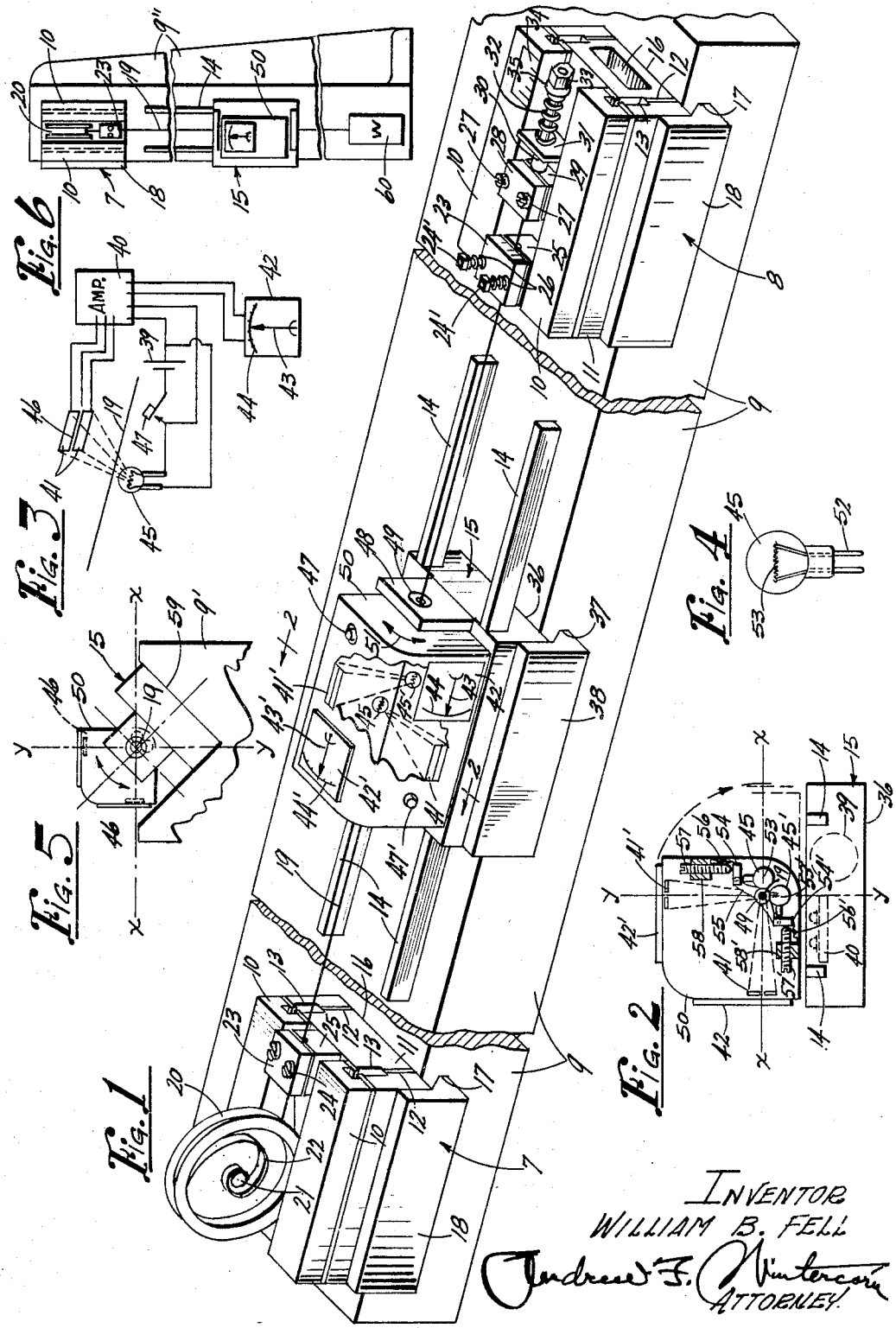
INVENTOR
WILLIAM B. FELL
ATTORNEY 3,226,832
LINEARITY TESTING GAUGE
William B. Fell, 320 McLain Ave., Rockford, Ill.
Filed Nov. 12, 1963, Ser. No. 322,960
13 Claims. (Cl. 33—86)

This invention relates to a linearity testing gauge for checking for straightness of surfaces on various things like machine tool beds in either the vertical or horizontal plane.

It is the principal object of my invention to provide a taut line or wire as the reference for checking for straightness and utilizing a vertical light beam from below the wire in checking for straightness in a vertical plane and a horizontal light beam from behind the wire in checking for straightness in a horizontal plane, the light beam in either case being directed toward two solar cells disposed in closely spaced parallel relationship to one another so that both cells are illuminated equally if the surface is straight, but the shadow of the wire cast on one or the other of these cells acts to decrease the current in one cell when it is cast on either side of center, the amount of variation from a straight or true condition being then readable on a micro-ammeter directly in terms of one or more ten-thousandths of an inch.

Two clamps which, in accordance with my invention, are adjustably secured by magnetic means in horizontally spaced parallel relationship to one another on the machine tool bed or other support being checked, have the opposite ends of the wire secured thereon under a predetermined tension, and a slide carrying the solar cells and electric lamps for transmitting the light beams, together with the micro-ammeter electrically connected with the cells, is movable along the bed or other support relative to the wire to enable checking at various points along the length of the bed or other support the linearity or straightness of the horizontal top surface and the vertical front or back surface along which the slide is movable. The magnetic means is preferably permanent magnets, and the slide carries parallel horizontal steel bars on opposite sides thereof that are slidably engageable with a close working fit in longitudinal slots provided in the permanent magnet portions of each clamp to shortcircuit these magnets and thus enable release of first one and then the other of the clamps from the bed or other support to permit their removal and make a nice compact assembly of the three units for easier storage in a carrying case.

The invention is illustrated in the accompanying drawing, in which:

FIG. 1 is a perspective view of the three units comprising my new and improved linearity testing gauge, namely, the two clamp units between which the horizontal line or wire for reference purposes is stretched, and the slide unit with a housing on it through which the wire extends freely and wherein the wire is subjected to light beams to cast a shadow on a pair of solar cells electrically connected with a micro-ammeter to indicate whatever variation there may be from a straight line in terms of one or more ten-thousandths of an inch by the deflection of a needle, one electric lamp and its related pair of solar cells being used in checking in a horizontal plane and another electric lamp and its related pair of solar cells being used in checking in a vertical plane;

FIG. 2 is a cross-section on line 2—2 of FIG. 1 showing more or less diagrammatically by dotted lines how the housing is rotatable through 90° about the taut wire as an axis to change from taking readings on a horizontal surface to taking readings on an angular surface, such as the V-way on a planar bed, as in FIG. 5;

FIG. 3 is a wiring diagram, showing for simplicity only one pair of solar cells and their associated lamp transmitting a light beam past the taut wire toward the cells;

FIG. 4 is a side view of one of the lamps on a larger scale, and

FIGS. 5 and 6 are views showing two variations, FIG. 5 showing how the gauge may be used in a V-bed to check its surfaces for straightness in the two inclined planes by showing variation from a true horizontal or vertical, and FIG. 6 showing how, in lieu of one of the clamps with its adjusting screw for securing the desired tightness of the wire, a plumb weight may be suspended on the lower end of the wire in its vertical position where it is desired to check for straightness of vertical surfaces, the break lines above and below the slide indicating again, as in FIG. 1, where there are similar break lines, that the parts of the gauge are shown enlarged in relation to the length of the support for purposes of better illustration, intermediate portions of the support in both FIG. 1 and FIG. 6 being broken away to save space and enable showing the important parts on a larger scale.

Similar reference numerals are applied to corresponding parts throughout these views.

Referring to the drawing, the reference numerals 7 and 8 designate the clamps that are magnetically secured to the machine tool bed or other support indicated at 9, permanent bar magnets being indicated at 10 on both clamps to provide the necessary magnetic pull through steel bottom plates 11, which plates are split lengthwise to provide poles with nonmagnetic separators therebetween, as indicated at 12, and have longitudinally extending rectangular slots 13 for slidable reception of parallel bars 14 provided on opposite sides of the slide 15 for short circuiting the magnets 10 to enable easy removal or shifting of the clamps 7 and 8 from one location to another on the bed. The bottom surfaces 16 on the plates 11 are smooth and accurately machined, as are also the vertical side surfaces 17 on the side plates 18 that are fixed to the bottom plates 11 along one side for accurate locating abutment with the vertical front or back surface on the bed 9. A steel music wire is indicated at 19, stretched taut between the two clamps 7 and 8, and a reel 20 is rotatably mounted on a horizontal axis on top of clamp 7 on a spindle 21 and has a torsion spring 22 fixed at one end to the spindle and at its other end to the rim of the reel tending normally to turn the reel in a clockwise direction so as to rewind the wire after use and, during its use, take up any slack in the wire between the rim and the clamping plate 23 that is fastened by means of screws 24 to clamp one end of the wire 19 between the plate 23 and a companion plate 25 fixed on the bottom plate 11 between the two permanent magnets 10. A similar arrangement of clamping plates 23 and 25 is provided at the other end of the wire 19 on clamp 8, but there the bolts 24' have compression springs 26 under the nuts thereon to clamp that end of the wire yieldably, the extremity of the wire being firmly clamped by the tightening of screws 27 to fasten plates 28 and 29 together that are slidable together relative to clamp 8 by means of a bolt 30 extending horizontally therefrom through a hole in a fixed plate 31 against the back of which a coiled compression spring 32 is compressible by means of a nut 33 threaded on the outer end of the bolt 30. Hence, assuming the clamp 7 has been set on the bed 9 and is held magnetically against shifting and the operator has placed the clamp 8 with slide 15 in demagnetizing relationship thereto, the operator can by shifting clamp 8 away from clamp 7 make the wire 19 taut, and then the extent of compression of spring 31 is shown on a scale 34 by the pointer 35 provided on a washer behind the nut 33.

Then, once the wire 19 is under the desired tension, clamp 8 is held by one hand while slide 15 is moved away from it to enable magnetic holding of clamp 8 on bed 9 with the wire 19 kept under the desired tension. Any change in tensioning can then be secured by tightening or loosening nut 33. Operating instructions accompanying the gauge will include a warning to the operator not to stretch the wire 19 too much for fear of breakage, the safe range of tension being indicated in terms of readings on scale 34. A monofiber nylon line may be used in lieu of wire 19.

The slide 15 has an accurately machined flat bottom surface 36 for slidable engagement on the top surface of bed 9 and has an accurately machined vertical surface 37 on its locating side plate 38 for sliding engagement on the vertical front or back surface of the bed 9. The slide 15 preferably has space therein for a battery 39 and a transistor amplifier 40, which are shown diagrammatically in FIG. 3 as electrically connected with solar cells 41 and a micro-ammeter 42 on which the deflection of the needle 43 in terms of micro-amperes is readable on a scale 44 graduated for direct reading in terms of one or more ten-thousandths of an inch variation from a normal straightness, the needle being on zero when the surface checks out straight and being deflected in one direction for variation one way and in the opposite direction for variation the other way from a correct or true condition. An electric lamp 45 directs a beam of light from behind or under wire 19, as the case may be, toward the solar cells 41 so that the wire 19 casts a shadow on these cells across the space 46 between the two cells when the surface being checked is correct, in which event the lamp 45 illuminates both cells alike and there is no deflection of needle 43 since the current generated in both cells is alike and they counterbalance one another. However, any deviation of the shadow one way or the other from the correct line causes a corresponding deflection of the needle 43 and the operator can read the runout directly in ten-thousandths of an inch and knows by the direction of deflection which way the runout is. Pushbutton 47 controls the current for and consequent illumination of lamp 45, as seen in FIG. 3, and in that figure only one lamp 45 is shown, for simplicity of illustration, although, as seen in FIG. 1, there is another lamp 45' cooperating with another pair of solar cells 41' in a plane at right angles to that of lamp 45 and solar cells 41, whereby to enable taking readings in either a vertical plane or a horizontal plane, lamp 45 being used for the horizontal plane readings and lamp 45' for the vertical plane readings. Another pushbutton 47' and another micro-ammeter 42' with needle 43' and graduated scale 44' are provided in connection with lamp 45' and solar cells 41'. The relatively close spacing of the lamps 45 and 45' with respect to wire 19 compared with the much wider spacing of the solar cells 41 and 41' with respect to the wire obviously makes for multiplication of the runout being gauged, which accounts for my being enabled to read the runout in terms of ten-thousandths of an inch.

The slide 15 has upwardly extending supports 48 on its opposite ends with bushings 49 rotatable in holes provided therein for support of a housing 50 for rotation through 90° on a horizontal axis, as indicated by arcuate arrow 51, the housing 50 having the micro-ammeters 42 and 42' mounted thereon in 90° relationship to another, and the wire 19 extending freely through the housing and with adequate radial clearance through the centers of these bushings 49 so that the housing 50 turns accurately on a horizontal axis coincident with the wire 19.

The lamps 45 and 45', as seen in FIG. 4, both have terminals 52 which, besides serving their usual function of providing electrical connections with their filament 53 disposed on a line with the wire 19, to enable electrically connecting these lamps with their leads from battery 39 and switch 47 or 47', as the case may be, serve by cooperation with plates 54 and 54' mounted by means of arms 55 for pivotal adjustment relative to one of the bushings 49 to swing the lamps 45 or 45' about the wire 19 as an axis to whatever extent is necessary in adjusting the lamps for a zero reading on the instruments 42 and 42' at the factory after the gauge is assembled, a spring 56 or 56' urging the lamp to swing in one direction about the bushing 49 as a center, and a screw 57 or 57' threaded in a fixed support 58 or 58' serving by adjustment toward the plate 54 or 54' to cause the lamp to swing in the opposite direction. The true plane for lamp 45 is indicated by the line $x$—$x$ and the true plane for the lamp 45' is indicated by the line $y$—$y$ in FIG. 2, both of these lines intersecting at the center of the wire 19.

In FIG. 5 the machine tool bed or other support indicated at 9' has a V-way 59 provided therein lengthwise thereof and it is possible with the present gauge inserted in the V in the manner shown to take readings in both a horizontal plane $xx$ and a vertical plane $yy$ to check for runout horizontally and/or vertically substantially as accurately as where the gauge is used as shown in FIG. 1. Here, the housing 50 is disposed at an angle of approximately 45° with respect to the slide 15 and both readings are taken with the housing in that one position at each step of the way from end to end of the bed 9'.

A vertical column, as on a milling machine or the like, is indicated at 9" with only the one clamp 7 shown as mounted on the upper end portion of the column and held in place magnetically, the wire 19 extending vertically downwardly from the reel 20 and clamping plate 23 and having a plumb-weight 60 suspended on the lower end thereof below the slide 15. The latter may be held in place by hand or other means, allowing freedom of movement the length of the column from place to place on the column. Here the housing 50 stays in the one position, similarly as in FIG. 5, to take readings in two vertical planes at right angles to one another for checking runout in the two planes on the two micro-ammeters. Obviously, the weight 60 maintains wire 19 taut on a truly vertical line and hence column 9" can be checked for the slightest degree of inclination from a true vertical in either of two vertical planes at right angles to one another to within a few ten-thousandths of an inch.

It is believed the foregoing description conveys a good understanding of the objects and advantages of my invention. The appended claims have been drawn to cover all legitimate modifications and adaptations.

I claim:

1. The method of accurately gauging the straightness of a surface which consists in supporting under tension a line in parallel relation to said surface, slidably supporting a light source for movement along the line on said surface, the light source being arranged to direct a beam parallel to said surface in the plane of and toward said line so as to cast a shadow on an object disposed on the other side of the line, and measuring photoelectrically the extent of deviation from a normal condition by reference to the shadow cast on either of two closely spaced coplanar solar cells, instead of between the same, whereby to determine the location, extent and direction of runout on said surface at various points along the length of said line.

2. The method as set forth in claim 1 wherein there is another surface disposed transversely to the first surface along which the slide resting on the first surface is also movable, there being a second light source on said slide directing the beam in the plane of and toward the line parallel to the second surface so as to cast a shadow on two closely spaced coplanar solar cells on the other side of the line, whereby to enable determining the location, extent and direction of runout on the second surface by reference to the deviation of the shadow from a normal position between said cells.

3. The method as set forth in claim 1 wherein the object onto which the shadow is cast is disposed farther behind the line than the light source is disposed in front of the line, whereby to multiply the runout proportionately.

4. The method as set forth in claim 2 wherein the object onto which the shadow is cast is disposed farther behind the line than the light source is disposed in front of the line, whereby to multiply the runout proportionately.

5. A linearity testing gauge comprising in combination a pair of spaced parallel fixed supports with a line adapted to be stretched therebetween in parallel relation to a surface the linearity of which is to be tested and upon which the two supports are adapted to be placed, a slide adapted to rest on the surface between said supports and to be moved lengthwise of the line from one location to another to check runout at each location relative to a normal condition, a light source carried on said slide arranged to direct a beam of light parallel to said surface in the plane of said line toward the line so that the line casts a shadow on an object disposed on the other side of the line, and means comprising two solar cells in closely spaced, coplanar relationship, parallel to one another and the line in a plane at right angles to the light beam from the light source defining an object on which the line casts a shadow where the deviation of the shadow from a normal line can be measured, said solar cells being electrically connected with an amplifier which in turn is electrically connected with a micro-ammeter on which the deflection of the needle from zero in either direction enables reading the extent of runout directly in small fractions of an inch, whereby the location, extent and direction of runout on said surface may be determined.

6. A gauge as set forth in claim 5 wherein there is a second surface in right angle relationship to the first mentioned surface against which the slide has abutment for purposes of checking runout on said second surface also, there being on said slide a second light source on one side of the line adapted to direct a light beam in the plane of said line and parallel to the second surface to cast a shadow on a second means defining a second object, the latter comprising two solar cells in closely spaced coplanar relationship parallel to one another and the line in a plane at right angles to the light beam from the light source, said solar cells being electrically connected with an amplifier which in turn is electrically connected with a micro-ammeter on which the deflection of the needle from zero in either direction enables reading the extent of runout directly in small fractions of an inch, the latter two solar cells being disposed on the other side of the line from the second light source where the deviation of the shadow from a normal line can be measured, whereby the location, extent and direction of runout on said surface may be determined.

7. A gauge as set forth in claim 5 wherein the light source is disposed closer to the line than the means defining the object on which the line casts a shadow, whereby to multiply the measurable runout and enable closer accuracy in measuring the same.

8. A gauge as set forth in claim 6 wherein the light source causing each shadow is disposed closer to the line than the means defining the object on which the line casts a shadow, whereby to multiply the measurable run-out and enable closer accuracy in measuring the same.

9. A linearity testing gauge comprising in combination a pair of spaced parallel fixed supports with a line adapted to be stretched therebetween in parallel relation to a surface the linearity of which is to be tested and upon which the two supports are adapted to be placed, a slide adapted to rest on the surface between said supports and to be moved lengthwise of the line from one location to another to check run-out at each location relative to a normal condition, a light source carried on said slide arranged to direct a beam of light parallel to said surface in the plane of said line toward the line so that the line casts a shadow on an object disposed on the other side of the line, and means defining an object on which the line casts a shadow where the deviation of the shadow from a normal line can be measured, whereby the location, extent and direction of runout on said surface may be determined, the slide including a housing carrying said light source and associated means pivoted relative to the slide on an axis coincident with the line and adapted to be swung from one position relative to the slide through 90° to another position, whereby to have the beam directed parallel to the surface or at right angles thereto but in either case in the plane of the line.

10. A gauge as set forth in claim 9 wherein the last mentioned means comprises two solar cells in closely spaced coplanar relationship parallel to one another in a plane at right angles to the light beam from the light source and parallel to the line, said solar cells being electrically connected with an amplifier which in turn is electrically connected with a micro-ammeter on which the deflection of the needle from zero in either direction enables reading the extent of runout directly in small fractions of an inch.

11. A linearity testing gauge comprising in combination a pair of spaced parallel fixed supports with a line adapted to be stretched therebetween in parallel relation to a surface the linearity of which is to be tested and upon which the two supports are adapted to be placed, a slide adapted to rest on the surface between said supports and to be moved lengthwise of the line from one location to another to check run-out at each location relative to a normal condition, and means carried by said slide for measuring runout by reference to said line, whereby the location, extent and direction of runout on said surface may be determined, the slide including a housing carrying said runout measuring means pivoted relative to the slide on an axis coincident with the line and adapted to be swung from one position relative to the slide through 90° to another position.

12. A linearity testing gauge comprising in combination a pair of spaced parallel fixed supports with a line adapted to be stretched therebetween in parallel relation to a surface the linearity of which is to be tested and upon which the two supports are adapted to be placed, a slide adapted to rest on the surface between said supports and to be moved lengthwise of the line from one location to another to check runout at each location relative to a normal condition, a light source carried on said slide arranged to direct a beam of light parallel to said surface in the plane of said line toward the line so that the line casts a shadow on an object disposed on the other side of the line, and means defining an object on which the line casts a shadow where the deviation of the shadow from a normal line can be measured, whereby the location, extent and direction of runout on said surface may be determined, there being a second surface in right angle relationship to the first mentioned surface against which the slide has abutment for purposes of checking runout on said second surface also, there being on said slide a second light source on one side of the line adapted to direct a light beam in the plane of said line and parallel to the second surface to cast a shadow on a second means defining a second object disposed on the other side of the line where the deviation of the shadow from a normal line can be measured, whereby the location, extent and direction of runout on said surface may be determined, the slide including a housing carrying said two light sources and associated means, pivoted relative to the slide on an axis coincident with the line and adapted to be swung from one position relative to the slide through 90° to another position.

13. A linearity testing gauge comprising in combination a pair of spaced parallel fixed supports with a line adapted to be stretched therebetween in parallel relation to a surface the linearity of which is to be tested and upon which the two supports are adapted to be placed, a slide adapted to rest on the surface between said supports and to be moved lengthwise of the line from one location to another to check runout at each location relative to a normal condition, permanent magnet means on each of said supports which through magnetizable material on the supports serve to secure the supports in place on a metallic surface solely by magnetic attraction, and short-circuiting bar means insertable in slots provided on said supports lengthwise between the poles of said permanent magnets to release said supports for removal from said surface or change in location on said surface, said bar means being mounted on and extending from opposite sides of said slide in alignment with the slots in said supports whereby first one and then the other of said supports may be released and the two supports with the bars entered in their slots form a unitary compact assembly.

References Cited by the Examiner

UNITED STATES PATENTS

| 831,862 | 9/1906 | Hamilton | 33—84 X |
| 1,591,485 | 7/1926 | Guillet | 33—84 |
| 2,342,605 | 2/1944 | Snyder | 88—14 |
| 3,122,840 | 3/1964 | Karstens | 33 |

FOREIGN PATENTS

| 444,786 | 3/1936 | Great Britain. |
| 67,283 | 4/1914 | Switzerland. |

ISAAC LISANN, *Primary Examiner.*

H. N. HAROIAN, *Examiner.*